(12) United States Patent  
Zur et al.

(10) Patent No.: US 9,262,745 B2  
(45) Date of Patent: Feb. 16, 2016

(54) GENERATING ROLES FOR A PLATFORM BASED ON ROLES FOR AN EXISTING PLATFORM

(75) Inventors: Yariv Zur, Saba (IL); David Kviti, Tel Aviv (IL)

(73) Assignee: SAP Portals Israel Ltd., Ra'anana (IL)

(*) Notice: Subject to any disclaimer, the term of this patent is extended or adjusted under 35 U.S.C. 154(b) by 977 days.

(21) Appl. No.: 13/432,710

(22) Filed: Mar. 28, 2012

(65) Prior Publication Data
US 2013/0262641 A1 Oct. 3, 2013

(51) Int. Cl.
*G06F 15/173* (2006.01)
*G06Q 10/10* (2012.01)
*H04L 29/08* (2006.01)

(52) U.S. Cl.
CPC .............. *G06Q 10/10* (2013.01); *H04L 67/10* (2013.01)

(58) Field of Classification Search
CPC .......... H04L 67/10; H04L 47/70; H04L 47/80
USPC ......................................... 709/223, 225, 229
See application file for complete search history.

(56) References Cited

U.S. PATENT DOCUMENTS

| | | | |
|---|---|---|---|
| 2005/0108396 A1* | 5/2005 | Bittner | 709/225 |
| 2006/0036633 A1 | 2/2006 | Chong et al. | |
| 2006/0136428 A1 | 6/2006 | Syeda-Mahmood | |
| 2009/0259990 A1 | 10/2009 | Olsson et al. | |
| 2010/0045796 A1 | 2/2010 | Fraley et al. | |
| 2010/0274614 A1 | 10/2010 | Fraley et al. | |
| 2011/0055188 A1* | 3/2011 | Gras | 707/706 |
| 2013/0254880 A1* | 9/2013 | Alperovitch et al. | 726/22 |

OTHER PUBLICATIONS

'SAP NetWeaver: Introduction to Portal on Device' [online]. SAP, 2012, [retrieved on Mar. 28, 2012]. Retrieved from the Internet: <URL: http://www.sdn.sap.com/irj/scn/go/portal/prtroot /docs/library/uuid/105a7704-36ec-2e10-9abe-fd230e673fb2?QuickLink=index& overridelayout=true>, 26 pages.

* cited by examiner

*Primary Examiner* — Glenford Madamba
(74) *Attorney, Agent, or Firm* — Fish & Richardson P.C.

(57) ABSTRACT

A computer-implemented method includes: receiving, using a computer system, first metadata portions regarding each of multiple first-platform roles defined for a first platform, each of the first-platform roles identifying at least one of multiple first-platform applications; generating, using the computer system, second-platform roles for a second platform, each of the second-platform roles corresponding to at least one of the first-platform roles; for each of the second-platform roles, accessing the first metadata portions for the corresponding at least one of the first-platform roles, and comparing, using the computer system, the accessed first metadata portions with second metadata portions assigned to multiple second-platform applications; and for each of the second-platform roles, assigning, using the computer system, at least one of the multiple second-platform applications to the second-platform role based on a match between at least one of the accessed first metadata portions and at least one of the second metadata portions.

16 Claims, 5 Drawing Sheets

GENERATING ROLES FOR A PLATFORM BASED ON ROLES FOR AN EXISTING PLATFORM

BACKGROUND

With the proliferation of mobile applications in general, for example in the corporate environment, the task of assigning these applications to the right users in the organization, and managing the assignments, is consuming more and more time and resources. For example, a role or other group that is merely a denominator or a folder has no context as to what can and should be encompassed by the role. In addition, various platforms or other environments exist (e.g., types of mobile devices, desktop or browser environments), each associated with multiple tools, for example to manage the applications for each individual user, configure the user's email and to deactivate a mobile device if it is lost. Managing many environments for many users can also be create a security risk for the organization.

SUMMARY

In a first aspect, a computer-implemented method for generating roles for a platform includes: receiving, using a computer system, first metadata portions regarding each of multiple first-platform roles defined for a first platform, each of the first-platform roles identifying at least one of multiple first-platform applications; generating, using the computer system, second-platform roles for a second platform, each of the second-platform roles corresponding to at least one of the first-platform roles; for each of the second-platform roles, accessing the first metadata portions for the corresponding at least one of the first-platform roles, and comparing, using the computer system, the accessed first metadata portions with second metadata portions assigned to multiple second-platform applications; and for each of the second-platform roles, assigning, using the computer system, at least one of the multiple second-platform applications to the second-platform role based on a match between at least one of the accessed first metadata portions and at least one of the second metadata portions.

In a second aspect, a computer program product is tangibly embodied in a computer-readable storage medium and includes instructions that when executed by a processor perform a method for generating roles for a platform. The method includes: receiving, using a computer system, first metadata portions regarding each of multiple first-platform roles defined for a first platform, each of the first-platform roles identifying at least one of multiple first-platform applications; generating, using the computer system, second-platform roles for a second platform, each of the second-platform roles corresponding to at least one of the first-platform roles; for each of the second-platform roles, accessing the first metadata portions for the corresponding at least one of the first-platform roles, and comparing, using the computer system, the accessed first metadata portions with second metadata portions assigned to multiple second-platform applications; and for each of the second-platform roles, assigning, using the computer system, at least one of the multiple second-platform applications to the second-platform role based on a match between at least one of the accessed first metadata portions and at least one of the second metadata portions.

In a third aspect, a system includes: one or more processors; and a computer program product embodied in a non-transitory computer readable medium, the computer program product including instructions that when executed by the one or more processors cause the system to perform a method for generating roles for a platform, the method including: receiving, using a computer system, first metadata portions regarding each of multiple first-platform roles defined for a first platform, each of the first-platform roles identifying at least one of multiple first-platform applications; generating, using the computer system, second-platform roles for a second platform, each of the second-platform roles corresponding to at least one of the first-platform roles; for each of the second-platform roles, accessing the first metadata portions for the corresponding at least one of the first-platform roles, and comparing, using the computer system, the accessed first metadata portions with second metadata portions assigned to multiple second-platform applications; and for each of the second-platform roles, assigning, using the computer system, at least one of the multiple second-platform applications to the second-platform role based on a match between at least one of the accessed first metadata portions and at least one of the second metadata portions.

Implementations can include any or all of the following features. The method further includes presenting identifiers for at least some of the first-platform roles to a content administrator, wherein the content administrator inputs at least some of the first metadata portions based on the identifiers. Receiving the first metadata portions comprises: discovering one or more of the first metadata portions from at least one of the first-platform applications identified by the corresponding first-platform role. The method further includes performing a crowdsourcing process regarding at least one of the first-platform applications, wherein receiving the first metadata portions comprises: discovering one or more of the first metadata portions for the at least one of the first-platform applications from a response to the crowdsourcing process. The first or second metadata portions comprise tags with semantic attributes. The method further includes contacting, after the comparison, a user who has the second-platform role and providing the user a choice regarding the at least one of the multiple second-platform applications found in the comparison. The second platform is a mobile platform.

Implementations can provide any or all of the following advantages. Existing roles can be leveraged in generating roles for a new platform. Roles can quickly be generated in an automatic and meaningful way for rapid deployment, such as in cases where the new platform quickly gains popularity among users.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples of systems and techniques where information from an existing structure of user roles can be leveraged in generating a new user role structure, for example when a new platform is being introduced.

Figure 1:
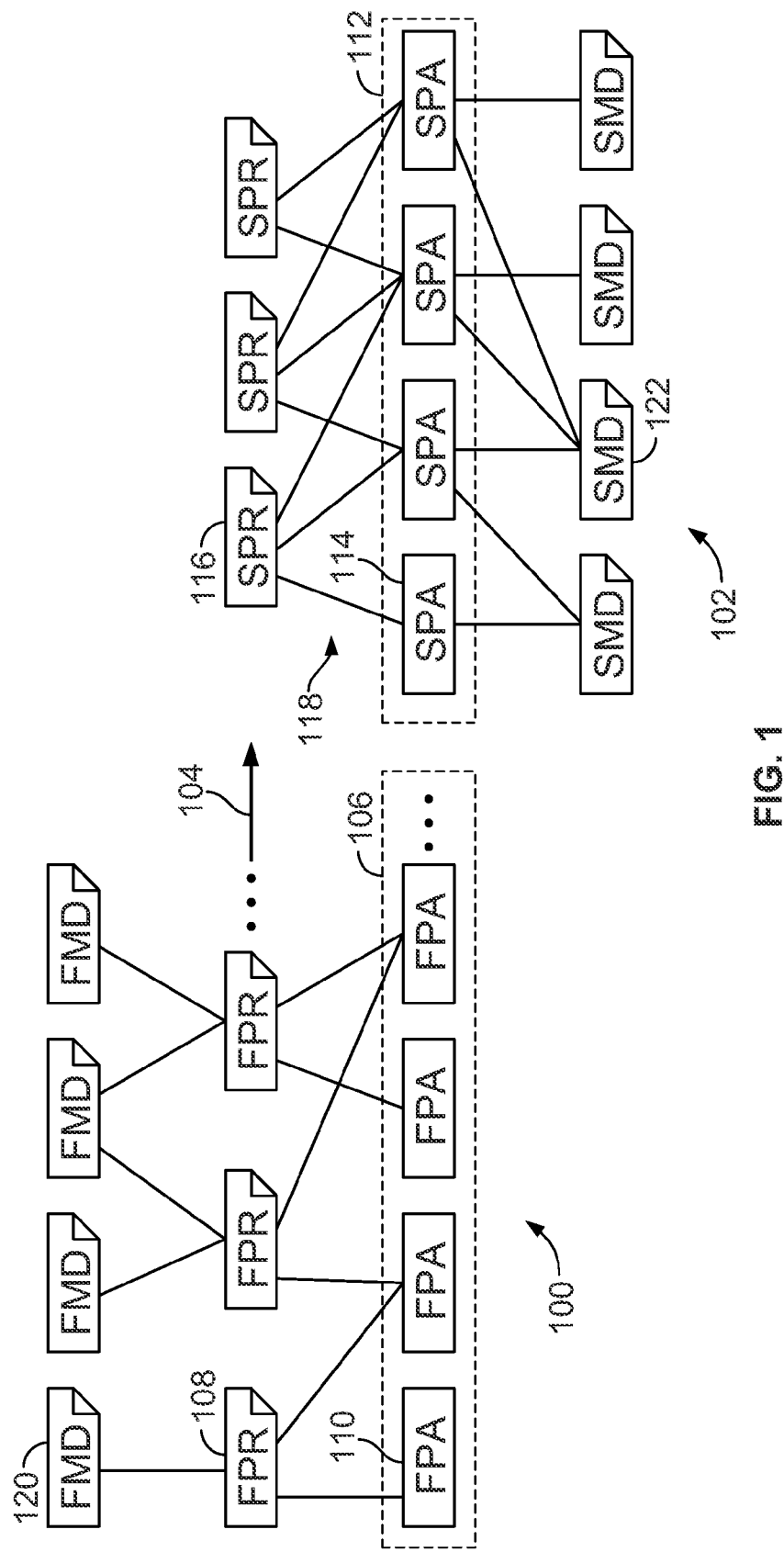
FIG. 1 schematically shows an example of role generation for a new platform using existing roles.

FIG. 1 schematically shows an example of role generation for a new platform using existing roles. In short, a first structure 100 of existing role assignments can be used in generating a second structure 102 of role assignments, as schematically indicated by an arrow 104. In some implementations, the first structure 100 can reflect existing role definitions in any computer system, e.g., in an Enterprise Resource Planning (ERP) system. The system (e.g., an ERP system) can be implemented on a first platform 106, for example a server-based architecture where users access various services using a client, such as a browser or an ERP-specific interface, on a suitable computer device (e.g., a personal computer or a laptop).

The first structure 100 includes multiple first-platform roles (FPR) 108. The FPRs 108 can include various roles associated with an ERP system, including, but not limited to, "sales manager", "Chief Executive Officer" (CEO), and "developer" roles. Each of the FPRs 108 here includes an association to one or more first-platform applications (FPA) 110 that are implemented on the first platform 106. One or more of the FPAs 110 can be sales applications and other FPAs can be procurement or invoicing applications, to name just a few examples. Two or more of the FPRs 108 can point to the same FPA(s) 110. For example, a sales manager role and a developer role can both include the same email application.

The FPAs 110 are here used as examples of the content within the respective FPRs 108. In some implementations, one or more other types of information are additionally, or instead, assigned to the role. For example, one or more pages defined in the first platform 106 can be included in at least one of the FPRs 108.

In some implementations, the FPAs 110 have been manually assigned to the FPRs 108, such as by a system administrator. For example, when each of the FPAs 110 is newly installed on the first platform 106, the system administrator may have added that new FPA to one or more of the FPRs 108 based on instructions from others in the organization and/or the administrator's own knowledge. That is, a system administrator (or other person) may manually have associated the relevant FPA(s) 110 with each respective FPR 108, and the user(s) having that particular role can then access the FPA(s).

A gradual development in the scope and contents of the FPRs 108 may not pose any significant problems in terms of the administrative work needed in the assignment and management of individual FPAs 110. To some extent, the fact that the roles already contain assigned FPAs, etc., can aid the process of choosing the FPR(s) to which a new application should be assigned.

However, the introduction of a new platform can require significantly more administrative work in generating the relevant roles and ensuring that the roles have the relevant applications assigned to them. Assume, for example, that a second platform 112 is introduced, here schematically shown as including multiple second-platform applications (SPA) 114. In some implementations, the second platform is based on newly emerging technology that has not been widely used in the past; or the organization using the first platform 106 is choosing to expand into one or more other existing platforms. For example, there has been, and is ongoing, a proliferation of mobile applications (including, but not limited to, the "apps" available for the Android™, iPhone™ and iPad™ mobile device platforms). Such or other similar developments can make the tasks of generating relevant roles and assigning relevant applications to the roles more burdensome. Resource security issues can also arise if the role assignments throughout multiple platforms are not properly monitored and maintained.

For this or other reasons, the present subject matter can capture the knowledge that an existing role structure represents, and seek to leverage this knowledge in more effectively creating and maintain a role structure for the new platform(s). In some implementations, this can be done by generating a new-platform role for each of the existing roles, tagging each of the existing roles with one or more semantic attributes (or other metadata) reflecting the context of the role, comparing the semantic attribute(s) with tags (or other metadata) of new-platform applications, and for any match between a role tag and application metadata, assigning that new-platform application to the new-platform role corresponding to the tagged role. Some examples will now be described.

Roles can be created for the second platform 112. Here, second-platform roles (SPR) 116 are schematically. When the SPRs 116 are first created, associations 118 do not yet exist between the SPRs 116 and the SPAs 114. Rather, the SPRs 116 at this point may be essentially empty or unassigned roles. The SPRs 116 can be formed using any suitable data structure capable of having one or more applications assigned thereto, for example the same or a similar type of roles that are used in a non-mobile system.

Each of the FPRs 108 is provided with one or more first metadata portions (FMD) 120 that correspond to a semantic attribute. In some implementations, the FMDs 120 can be applied by tagging the role with the attribute(s). For example, if the FPR 108 is named "sales manager", then the semantic attributes "sales" and "manager" can be applied. That is, the FMDs 120 in a sense characterize the corresponding role in terms of its meaning and/or context. Two or more of the FPRs 108 can have the same FMD(s) 120 assigned. Examples of how the FMDs 120 can be applied will be described with reference to figures below.

Metadata relating to content in the second platform 112 is also used. In some implementations, each of the SPAs 114 is provided with one or more second metadata portions (SMD) 122 that correspond to a semantic attribute. In some implementations, the SPAs 114 can be provided with the SMDs 122 by tagging the SPAs with attributes. For example, the title of the SPA 114 can be analyzed to obtain one or more semantic terms. As another example, tags that have been applied to this particular SPA by users (e.g., in an online environment where apps or other mobile applications are available) can be obtained and used. As another example, one or more connections of a resource can be analyzed, such as by determining that a page is connected to a Customer Relationship Management (CRM) system and therefore labeling the page "CRM", "customer" or "customer-facing", to name just some possibilities. In certain implementations, some or all of the SMDs 122 can be determined similarly to the way(s) that the FMDs 120 are determined.

That is, the FPRs 108 have been provided with the FMD 120, and the SPAs 114 have been provided with the SMDs 122. One or more comparisons between these metadata portions are then performed. For example, the system can process the SPAs one at a time, and analyze its SMDs 122 individually. For each SMD of that SPA, the system can evaluate whether there is an exact or close match with any of the FMDs 120. For example, an exact match occurs when the SMD 122 and the FMD 120 are both "sales". As another example, a close match can occur when the SMD and the FMD are not identical, but are sufficiently similar according to some resource of semantic significance. In some implementations, if the SMD and the FMD are synonyms according to a thesaurus, then a close match can be detected. For example, the close match might be detected only when each dictionary entry lists the other metadata portion, and not when only one of them is a synonym of the other. In some implementations, the FMDs 120 and/or SMDs 122 are generated by selecting tags from a taxonomy of tags organized according to meaning, for example stored in a unified tag repository.

Each detected match corresponds to a mapping between at least one of the FMDs 120 and the SMDs 122. Based on the assignments of the FMDs to the FPRs 108, these mappings associate each of the FPRs 108 with one or more of the SMDs 122. Moreover, based on the assignments of the SMDs 122 to the SPAs 114, these mappings also associate each of the FPRs 108 with one or more of the SPAs 114. Likewise, the mappings associate each of the SPAs 114 with one or more of the FPRs 108.

As mentioned, the SPRs 116 were generated so that each of them corresponds to one of the FPRs 108. It follows that the determined associations—those between the SPAs 114 and the FPRs 108—also implicate which of the SPAs are relevant for each of the SPRs. Accordingly, the associations 118 can be created to assign the relevant SPA(s) to each of the SPRs 116.

The processing to assign the SPAs 114 to the SPRs can be performed at one or more times. In some implementations, the processing is initially performed when the second platform 112 is introduced, and the SPRs 116 can then be updated each time a new one of the SPAs becomes available. For example, when the new SPA 114 becomes available (e.g., in form of a mobile app), the system that manages roles can determine the SPR(s) 116 to which it relates, and either automatically make the new SPA available to the users having the role(s), or otherwise recommend the new SPA to those users.

Figure 2:
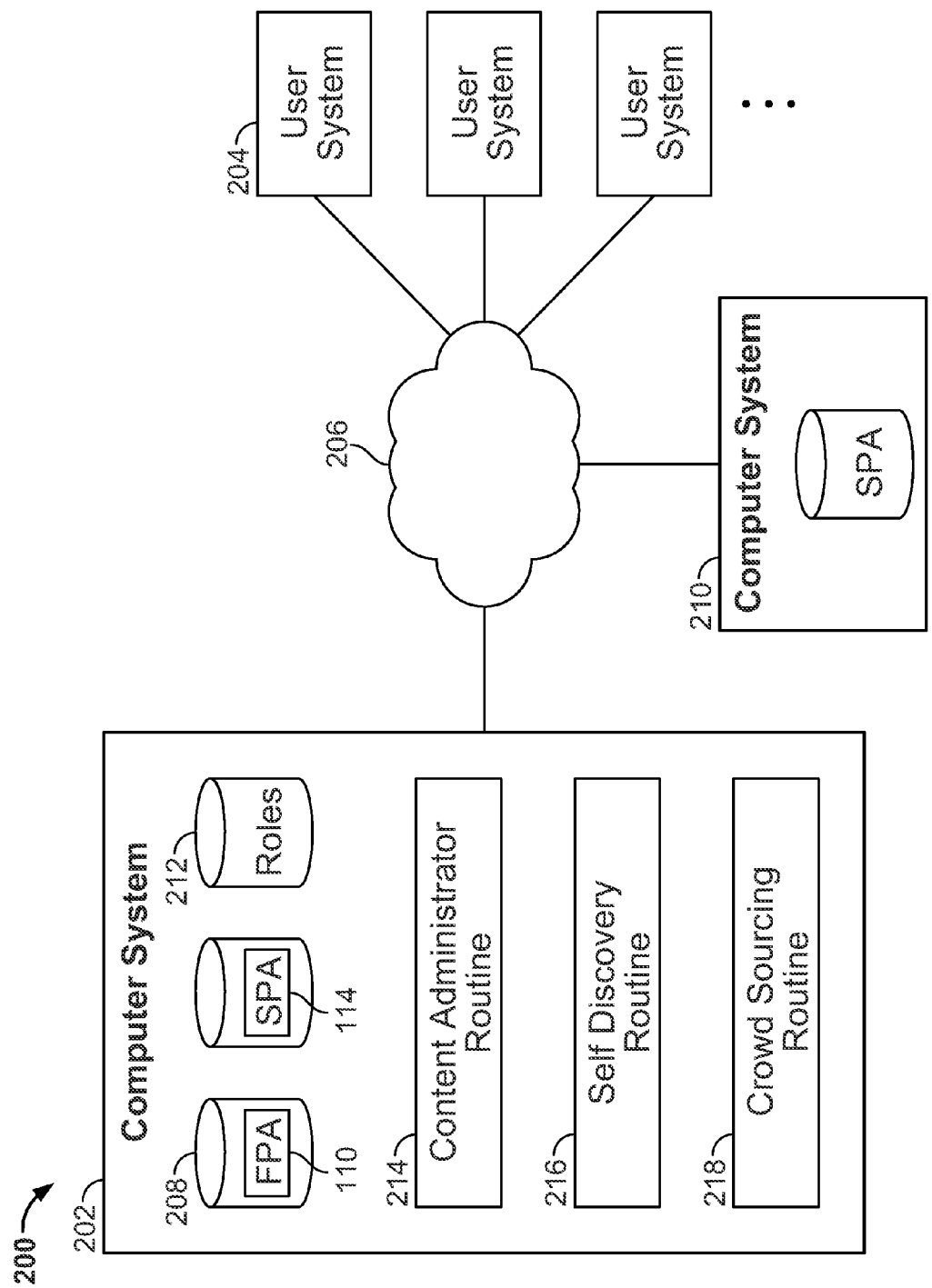
FIG. 2 shows an example of a system that generates metadata regarding a role or application.

FIG. 2 shows an example of a system 200 that generates metadata regarding a role or application. The system 200 includes a computer system 202 that makes software available to individuals operating one or more user systems 204, which is or are connected to the computer system 202 through any suitable form of network 206, such as a local computer network or the internet. In some implementations, the computer system 202 has code for some or all of the FPAs 110 and/or the SPAs 114 stored in at least one repository 208. For example, the computer system 202 can act as a server to which the user system(s) 204 can connect, such as using a browser or other client program, to access one or more of the FPAs and SPAs. As another example, another computer system 210 can provide access to one or more of the SPAs, such as by operating an online store or other vending environment where the SPAs (e.g., mobile apps) are available.

In the situation illustrated here, the computer system 202 currently has a role repository 212 in which the FPRs 108 (FIG. 1), but not yet the SPRs 116 (FIG. 1) have been defined. The computer system 202 can then be used for one or more operations as part of creating the SPRs. Particularly, the computer system 202 can facilitate the assignment of metadata (e.g., the FMD 120 in FIG. 1) to individual ones of the FPRs.

The metadata can be manually assigned. In some implementations, the computer system 202 includes a content administrator routine 214 (e.g., a software program) that allows a user (e.g., an administrator) to manually specify the relevant metadata for some or all of the FPRs 108. For example, the content administrator routine 214 can identify the FPR(s) (e.g., their respective identifiers) to the user and accept user input that indicates the metadata portion(s) relevant to the particular FPR(s). In some implementations, the content administrator routine 214 uses a tags taxonomy from which the user chooses one or more tags for each of the FPR. Other ways of manually assigning some or all metadata can be used.

The metadata can be assigned by discovery. In some implementations, the computer system 202 includes a self-discovery routine 216 (e.g., a software program) that allows the computer system to automatically detect the relevant semantic attribute(s) for each of the FPRs. For example, the discovery can be based on the context(s) of content that is included in the particular FPR. Such context can include, but is not limited to, semantics of the FPA(s), documents or other information assigned to the FPR. In a sense, the self-discovery routine 216 can facilitate the propagation of such context(s) from the content to the FPR itself.

The metadata can be assigned using one or more external resources. In some implementations, the computer system 202 includes a crowdsourcing routine 218 (e.g., a software program) facilitating that one or more other persons (e.g., members of a larger community, or the general public) can submit contextual or other semantic information. The crowdsourcing routine 218 can identify some or all of the FPRs 108 (FIG. 1) to users who have that role or another one of the roles, and allow the user(s) to submit tags (or other forms of metadata) regarding the identified role. For example, when the computer system 202 is used by an organization to provide ERP services to its employees or to its customers, the crowdsourcing routine 218 can contact the employees and/or users at the customers, and ask them to provide terms (or other information) characterizing the role.

When the metadata has been assigned to the roles using one or more of the routines 216-218, the process of finding the relevant applications can continue, for example as described above. The computer system 202 can the newly generated roles (e.g., the SPRs 116) in the role repository 212, and update the generated roles with the appropriate assignments of applications based on the processing.

Figure 3:
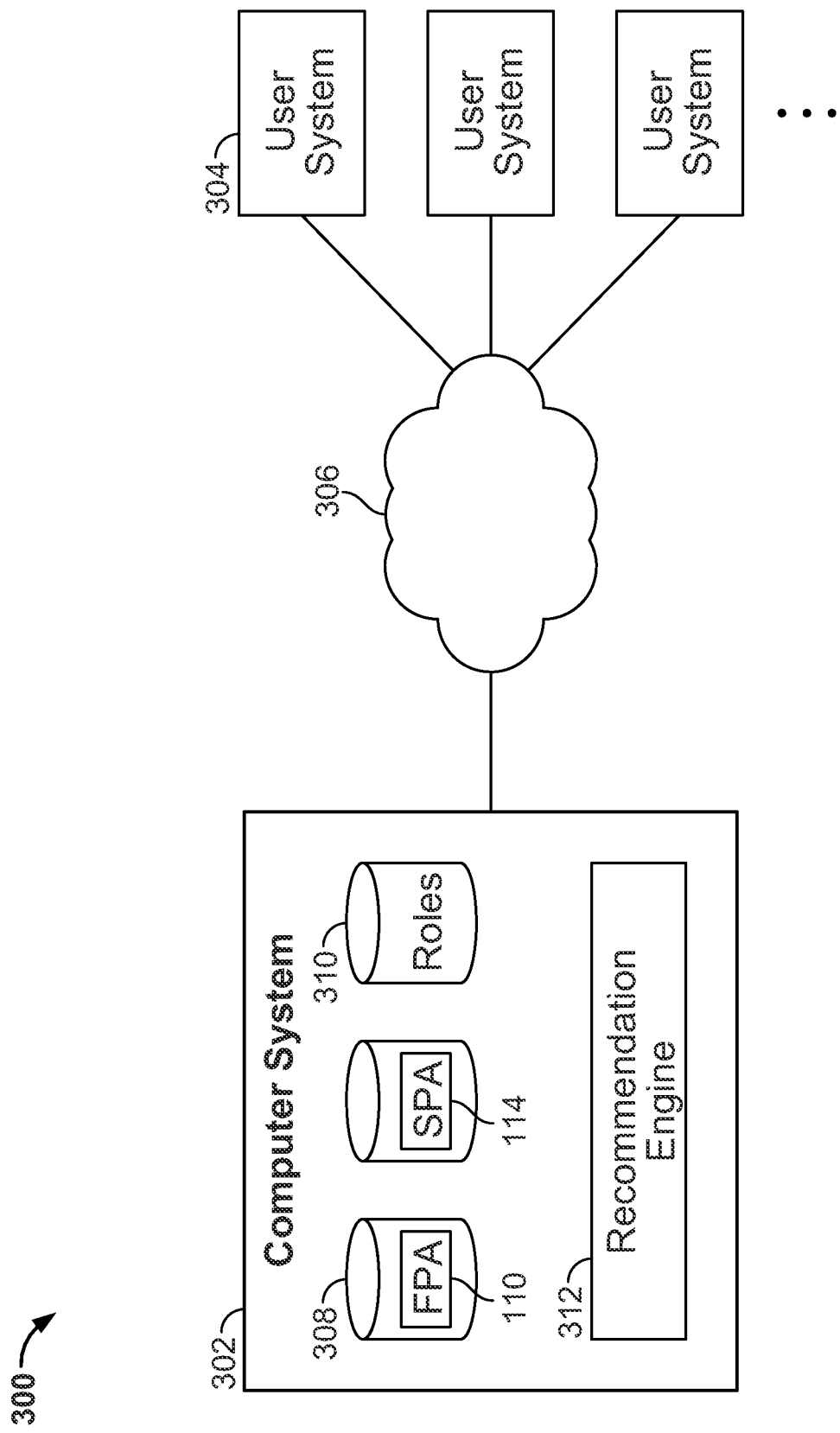
FIG. 3 shows an example of a system that recommends an application based on user role.

FIG. 3 shows an example of a system 300 that recommends an application based on user role. Here, a computer system 302 is connected to one or more user systems 304 through any suitable type of computer network 306. Similar to the computer system 202 (FIG. 2), the computer system 302 can store the FPAs 110 and/or the SPAs 114 in at least one repository 308, and make them available to users. In the situation depicted in this example, the roles regarding the SPAs 114 (e.g., the SPRs 116) have been generated and are being used. That is, the persons operating the user system(s) 304 can be assigned one or more of the roles and the corresponding ones of the SPAs 114 are therefore available to the users.

The computer system 302 can provide recommendations to one or more of the users. In some implementations, the computer system 302 includes a recommendation engine 312 (e.g., a software program) that can identify one or more relevant applications and offer them to at least one user. For example, assume that the following role assignments have been made:

| Application | Role A | Role B |
|---|---|---|
| Sales application 1 | Yes | — |
| Sales application 2 | Yes | — |
| Sales application 3 | Yes | — |
| Sales application 4 | — | Yes |

That is, role A has three sales applications assigned to it, and role B has only one, another sales application, assigned to it. These role assignments may have been generated in any particular way, such as manually by an administrator.

First, performing some role processing (e.g., as described earlier) can lead to the conclusion that role A should be deemed a sales role. Role B, however, only has one sales application in this example, and may furthermore have many other applications assigned to it (not listed here), signifying that the role B is not a pure sales role. For example, role B should perhaps not be tagged as a sales role at all.

However, the fourth application is known to be a sales application, perhaps as a result of some or all of the semantic attributions described in earlier examples. The recommendation engine 312 can therefore recommend the fourth application to some or all of the users having role A. For example, if the fourth application is widely adopted and used by the persons who receive such recommendations, the fourth application can at some point be made part of role A. Other recommendations based on the semantics of role(s) and application(s) can be made.

Figure 4:
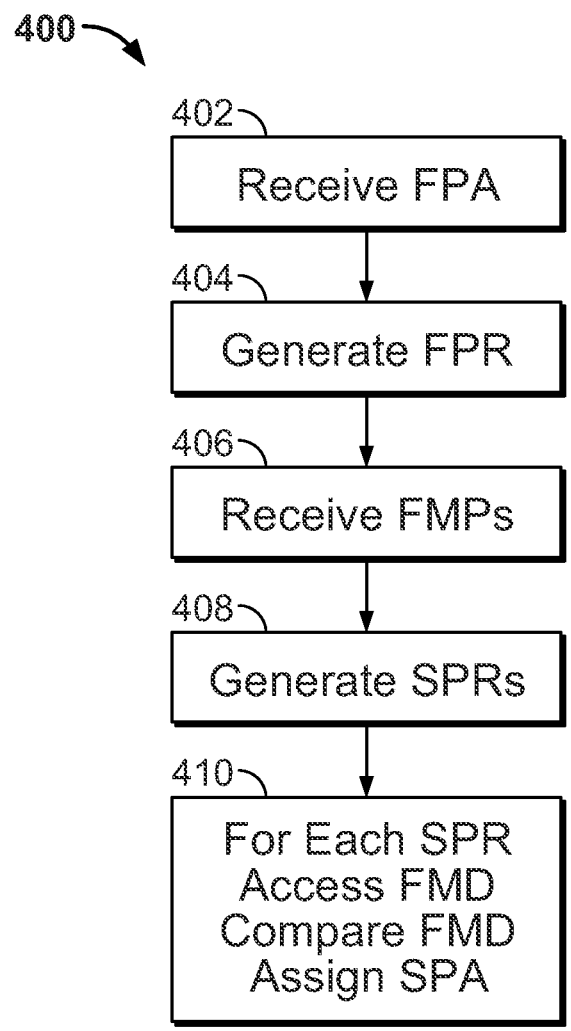
FIG. 4 shows an example of a flowchart for a method of generating roles for a platform.

FIG. 4 shows an example of a flowchart for a method 400 of generating roles for a platform. The method 400 can be performed by one or more processors executing instructions stored in a computer readable medium, for example in the systems 100-300 described above. This example will refer to some components of those systems to illustrate the operation(s). In some implementations, at least one additional operation can be performed. Also, one or more of the operations can be performed in a different order.

The method 400 involves receiving first-platform applications at 402. For example, the FPAs 110 are installed in the computer system 202 or 302.

At 404, first-platform roles for a first platform are generated. For example, the FPRs 108 can be manually generated for the first platform 106 and stored in the role repository 212 or 310.

At 406, first metadata portions are received. For example, the FMDs 120 are received, the FMDs relating to the FPRs 108 defined for the first platform 106. Each of the FPRs identifies at least one of the FPAs 110.

At 408, second-platform roles are generated. For example, the SPRs 116 Each of the SPRs corresponds to one of the FPRs.

At 410, one or more operations are performed for each of the second-platform roles. For example, regarding each of the SPRs 116, the corresponding one of the FPRs 108 can be identified, its assigned one(s) of the FMDs 120 can be accessed, a comparison can be performed between the FMD(s) 120 and the SMDs 122 can be performed, and any matching SPA(s) can be assigned to that SPR.

One or more updates can be performed. For example, when a new SPA is introduced, an evaluation can be performed to find the appropriate SPR(s) for that application. As another example, one or more of the SPRs can be updated as a result of the responses to user recommendations.

Figure 5:
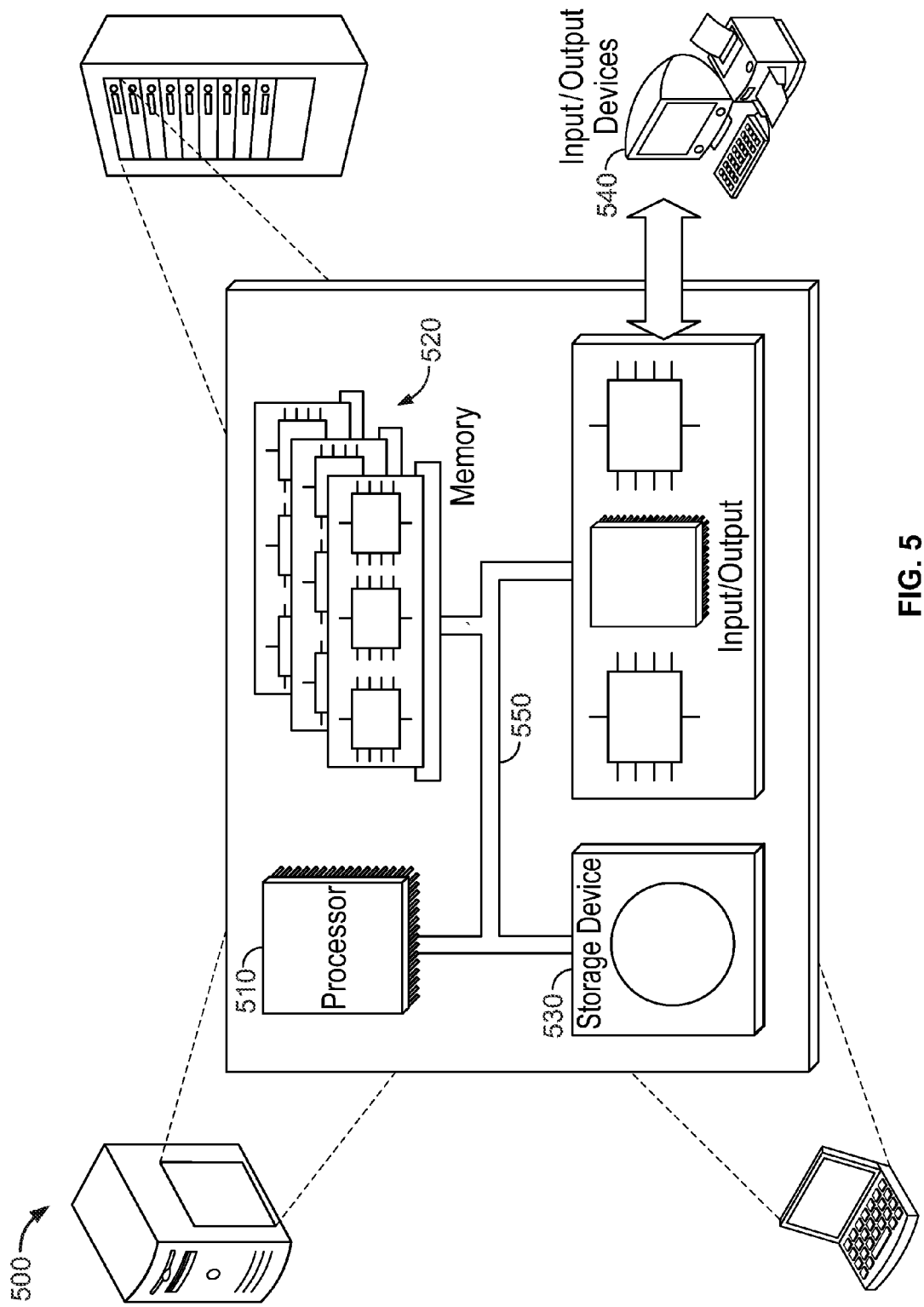
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method that uses metadata from an existing structure of user roles to assign application programs to another structure of user roles, comprising:
   identifying, by a computer system, a set of first user roles that are used to control access to a set of first application programs, wherein:
   (i) the first application programs are implemented on a first computer platform in which user access to the first application programs is provided through a laptop or personal computer, and
   (ii) each user role in the set of first user roles is assigned (a) multiple respective users, and (b) one or more of the first application programs to which the multiple respective users have access due to their user role assignment;
   generating, by the computer system, a set of second user roles that are to be used to control access to a set of second application programs, by generating a corresponding second user role for each user role in the set of first user roles, wherein:
   (i) the second application programs are implemented on a second computer platform that is a mobile device platform in which user access to the second application programs is provided through use of a particular type of mobile device, and the second application programs are each a mobile application for the mobile device platform,
   (ii) each user role in the set of second user roles will be assigned multiple respective users, and
   (iii) each user role in the set of second user roles corresponds to a corresponding user role in the set of first user roles,
   wherein when the set of second user roles are generated, assignments do not exist between the set of second user roles and the second application programs;
   accessing, by the computer system, first metadata that is assigned to the set of first user roles;
   accessing, by the computer system, second metadata that is assigned to the second application programs;
   comparing, by the computer system, the first metadata that is assigned to the set of first user roles to the second metadata that is assigned to the second application programs to identify a matching portion of the first metadata that matches a matching portion of the second metadata;
   assigning, by the computer system, a second matching application program from the set of second application programs to a second matching user role from the set of second user roles, due to the computer system having identified that:
   (a) the matching portion of the first metadata matches the matching portion of the second metadata,
   (b) the matching portion of the first metadata is assigned to a first matching user role from among the set of first user roles,
   (c) the first matching user role corresponds to the second matching user role, and
   (d) the matching portion of the second metadata is assigned to the second matching application program.

2. The computer-implemented method of claim 1, wherein: the first application programs are implemented on one or more servers, and the access to the first application programs through the personal computer or laptop is provided through a web browser executing on the personal computer or laptop.

3. The computer-implemented method of claim 1, wherein the mobile device platform is the ANDROID, IPHONE, or IPAD mobile device platform.

4. The computer-implemented method of claim 1, further comprising receiving, by the computer system, user input from an administrator that assigns the first metadata to the set of first user roles.

5. The computer-implemented method of claim 1, further comprising automatically detecting, by the computer system, the first metadata from documents assigned to the set of first user roles, and as a result assigning, by the computer system, the first metadata to the set of first user roles.

6. The computer-implemented method of claim 1, further comprising receiving, by the computer system, user input from an administrator that assigns the first application programs to the set of first user roles.

7. The computer-implemented method of claim 1, further comprising assigning, by the computer system, the matching portion of the second metadata to the second matching application program as a result of the matching portion of the second metadata being in a title of the second matching application program.

8. The computer-implemented method of claim 1, wherein identifying the match between the portion of the first metadata and the portion of the second metadata includes determining that the portion of the first metadata and the portion of the second metadata are an exact match or are synonyms.

9. A non-transitory computer-readable storage medium comprising instructions that, when executed by a processor, perform a method for generating roles for a platform, the method comprising:
   identifying, by a computer system, a set of first user roles that are used to control access to a set of first application programs, wherein:
   (i) the first application programs are implemented on a first computer platform in which user access to the first application programs is provided through a laptop or personal computer, and
   (ii) each user role in the set of first user roles is assigned (a) multiple respective users, and (b) one or more of the first application programs to which the multiple respective users have access due to their user role assignment;

generating, by the computer system, a set of second user roles that are to be used to control access to a set of second application programs, by generating a corresponding second user role for each user role in the set of first user roles, wherein:
  (i) the second application programs are implemented on a second computer platform that is a mobile device platform in which user access to the second application programs is provided through use of a particular type of mobile device, and the second application programs are each a mobile application for the mobile device platform,
  (ii) each user role in the set of second user roles will be assigned multiple respective users, and
  (iii) each user role in the set of second user roles corresponds to a corresponding user role in the set of first user roles,
  wherein when the set of second user roles are generated, assignments do not exist between the set of second user roles and the second application programs;
accessing, by the computer system, first metadata that is assigned to the set of first user roles;
accessing, by the computer system, second metadata that is assigned to the second application programs;
comparing, by the computer system, the first metadata that is assigned to the set of first user roles to the second metadata that is assigned to the second application programs to identify a matching portion of the first metadata that matches a matching portion of the second metadata;
assigning, by the computer system, a second matching application program from the set of second application programs to a second matching user role from the set of second user roles, due to the computer system having identified that:
  (a) the matching portion of the first metadata matches the matching portion of the second metadata,
  (b) the matching portion of the first metadata is assigned to a first matching user role from among the set of first user roles,
  (c) the first matching user role corresponds to the second matching user role, and
  (d) the matching portion of the second metadata is assigned to the second matching application program.

10. The non-transitory computer-readable storage medium of claim 9, wherein:
  the first application programs are implemented on one or more servers, and the access to the first application programs through the personal computer or laptop is provided through a web browser executing on the personal computer or laptop.

11. The non-transitory computer-readable storage medium of claim 9, wherein the mobile device platform is the ANDROID, IPHONE, or IPAD mobile device platform.

12. The non-transitory computer-readable storage medium of claim 9, wherein the method further comprises receiving, by the computer system, user input from an administrator that assigns the first metadata to the set of first user roles.

13. The non-transitory computer-readable storage medium of claim 9, wherein the method further comprises automatically detecting, by the computer system, the first metadata from documents assigned to the set of first user roles, and as a result assigning, by the computer system, the first metadata to the set of first user roles.

14. The non-transitory computer-readable storage medium of claim 9, wherein the method further comprises receiving, by the computer system, user input from an administrator that assigns the first application programs to the set of first user roles.

15. The non-transitory computer-readable storage medium of claim 9, wherein the method further comprises assigning, by the computer system, the matching portion of the second metadata to the second matching application program as a result of the matching portion of the second metadata being in a title of the second matching application program.

16. The non-transitory computer-readable storage medium of claim 9, wherein identifying the match between the portion of the first metadata and the portion of the second metadata includes determining that the portion of the first metadata and the portion of the second metadata are an exact match or are synonyms.

* * * * *